US008845414B2

(12) United States Patent
Watkins et al.

(10) Patent No.: US 8,845,414 B2
(45) Date of Patent: Sep. 30, 2014

(54) WAGERING GAME WITH PROGRESSIVE AWARDS WON BY ACCUMULATING PROGRESSIVE PRIZE SEGMENTS

(71) Applicant: Multimedia Games, Inc., Austin, TX (US)

(72) Inventors: Brian Watkins, Austin, TX (US); Michael Conway, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 17 days.

(21) Appl. No.: 13/627,393

(22) Filed: Sep. 26, 2012

(65) Prior Publication Data

US 2013/0065665 A1 Mar. 14, 2013

Related U.S. Application Data

(63) Continuation-in-part of application No. 12/270,672, filed on Nov. 13, 2008, now abandoned.

(60) Provisional application No. 60/987,711, filed on Nov. 13, 2007.

(51) Int. Cl.
*G06F 17/00* (2006.01)

(52) U.S. Cl.
USPC ............................................................ 463/20

(58) Field of Classification Search
USPC ..................................................... 463/16–25
See application file for complete search history.

(56) References Cited

U.S. PATENT DOCUMENTS

| | | | | |
|---|---|---|---|---|
| 8,336,536 | B1 * | 12/2012 | Wood-Putnam et al. | 126/204 |
| 2005/0187014 | A1 | 8/2005 | Saffari et al. | |
| 2006/0040723 | A1 | 2/2006 | Baerlocher et al. | |
| 2006/0052160 | A1 | 3/2006 | Saffari et al. | |
| 2007/0060320 | A1 | 3/2007 | Kelly et al. | |
| 2007/0218982 | A1 | 9/2007 | Baerlocher | |
| 2009/0104977 | A1 * | 4/2009 | Zielinski | 463/25 |
| 2009/0124339 | A1 * | 5/2009 | Barton et al. | 463/20 |
| 2012/0252552 | A1 * | 10/2012 | Barton et al. | 463/20 |

OTHER PUBLICATIONS

International Search Report for PCT application No. PCT/US2008/083438 dated Jan. 15, 2009 (3 pages).
Written Opinion of the International Search Authority for PCT application No. PCT/US2008/083438 dated Jan. 15, 2009 (5 pages).

* cited by examiner

*Primary Examiner* — Ronald Laneau
(74) *Attorney, Agent, or Firm* — Nathan H. Calvert, Esq.; Russell D. Culbertson, Esq.; JP Cody, Esq.

(57) ABSTRACT

A gaming system, apparatus, and method are disclosed providing game players an exciting chance to win any of multiple progressive prizes within a free spin bonus round by accumulating different prize segment symbols which are displayed in a meter zone for each possible progressive prize. Various ways are described to add free spins to the bonus round, making it more exciting by giving the player increased chance to fill all the segments associated with a particular progressive prize, thereby winning the prize.

16 Claims, 8 Drawing Sheets

WAGERING GAME WITH PROGRESSIVE AWARDS WON BY ACCUMULATING PROGRESSIVE PRIZE SEGMENTS

CROSS-REFERENCE TO RELATED APPLICATION

This application is a continuation-in-part and claims the benefit under 35 U.S.C. §120 of U.S. patent application Ser. No. 12/270,672, filed Nov. 13, 2008, and entitled "Method, Apparatus, and Program Product for Conducting a Variable Prize Progression Game for One or More Players," which claims the benefit, under 35 U.S.C. §119(e), of U.S. Provisional Patent App. No. 60/987,711 filed Nov. 13, 2007, and also entitled "Method, Apparatus, and Program Product for Conducting a Variable Prize Progression Game for One or More Players." The entire contents of both of these parent applications are incorporated herein by this reference.

FIELD OF THE INVENTION

This invention relates to gaming systems and to gaming machines through which players may participate in wagering games, and in particular slot machine games with a networked progressive feature awarded through a bonus round that provides multiple progressive prize segments and accumulates the progressive prize segments during the course of play.

BACKGROUND

Many different types of gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Many video-based gaming machines have three or five spinning reels that may be stopped to display a matrix of game symbols. The symbols displayed on the stopped reels correlate to a result of the game. Video-based gaming machines may also be used to show card games or various types of competitions such as simulated horse races in which wagers may be placed. Game manufacturers are continuously pressed to develop new game presentations, formats, and game graphics in an attempt to provide high entertainment value for players and thereby attract and keep players.

SUMMARY OF THE INVENTION

The present invention includes wagering games, gaming machines, networked gaming systems and methods providing game players an exciting chance to win any of multiple progressive prizes within a free spin bonus round by accumulating different prize segment symbols which are displayed in a meter zone for each possible progressive prize. Various ways are described to add free spins to the bonus round, making it more exciting by giving the player increased chance to fill all the segments associated with a particular progressive prize, thereby winning the prize.

Another version of the invention is a computer program stored on a non-transitory readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels each including one or more symbol locations. The program also has game controller program code for determining game play results involving spins or other randomization of an array of symbols, and providing the progressive prize segment and its animations.

Another version of the invention is a gaming system that includes one or more gaming servers, and a group of electronic gaming machines connected to the servers by a network. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game results to present the results received from the server in an entertaining manner. However, other embodiments of course might use a thin client architecture in which the animation is also conducted by the server and electronic gaming machines serve merely as a terminal to receive button or touchscreen input from the player and to display graphics received from the server.

Different features may be included in different versions of the invention. For example, different animation themes may be applied that display the application of the progressive prize segment field in different ways.

These and other advantages and features of the invention will be apparent from the following description of the preferred embodiments, considered along with the accompanying drawings.

DETAILED DESCRIPTION OF PREFERRED EMBODIMENTS

Figure 1A:
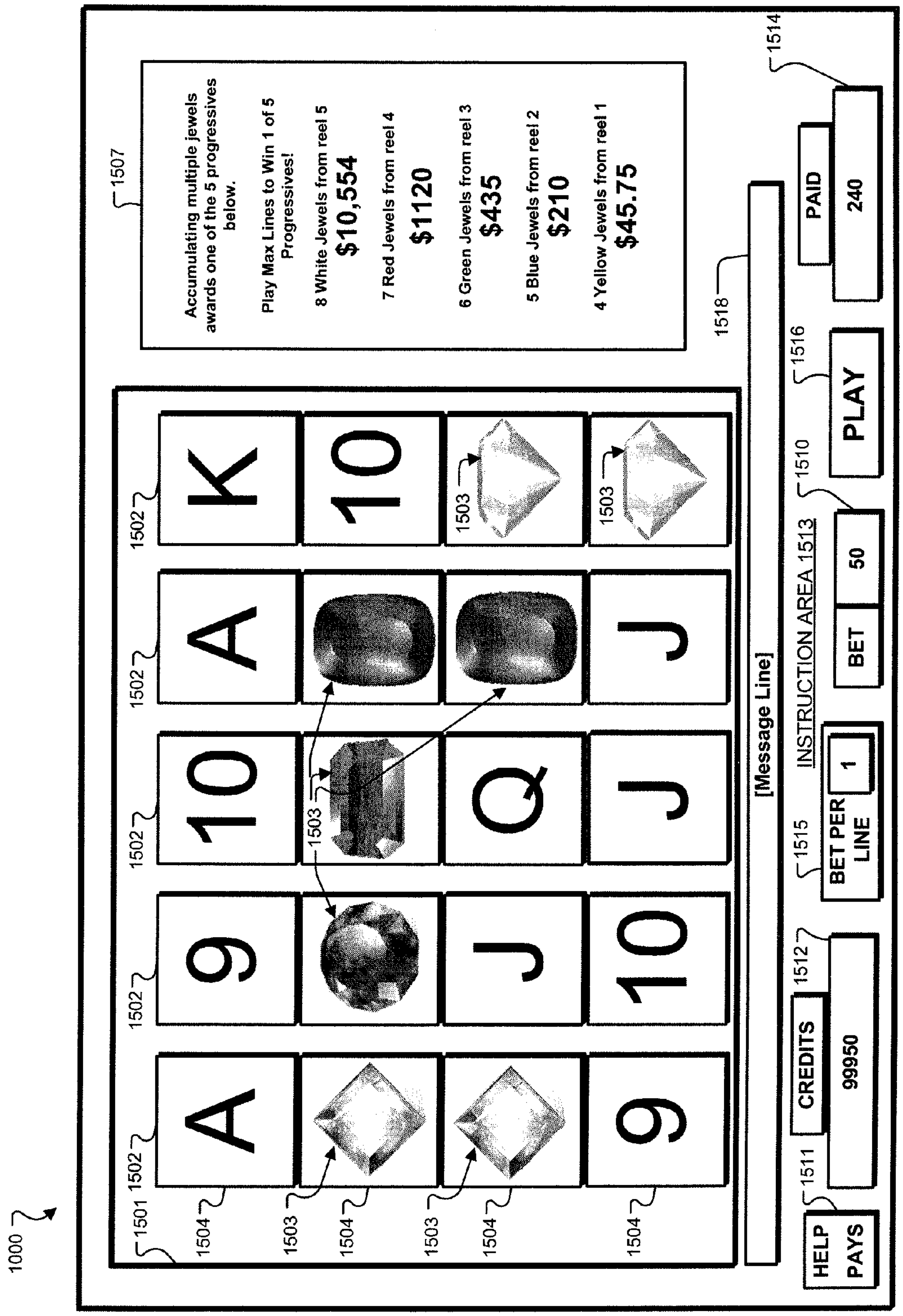
FIG. 1A is an example screen diagram of a bonus game starting display for a bonus game including a progressive prize segment feature.
Figure 1B:
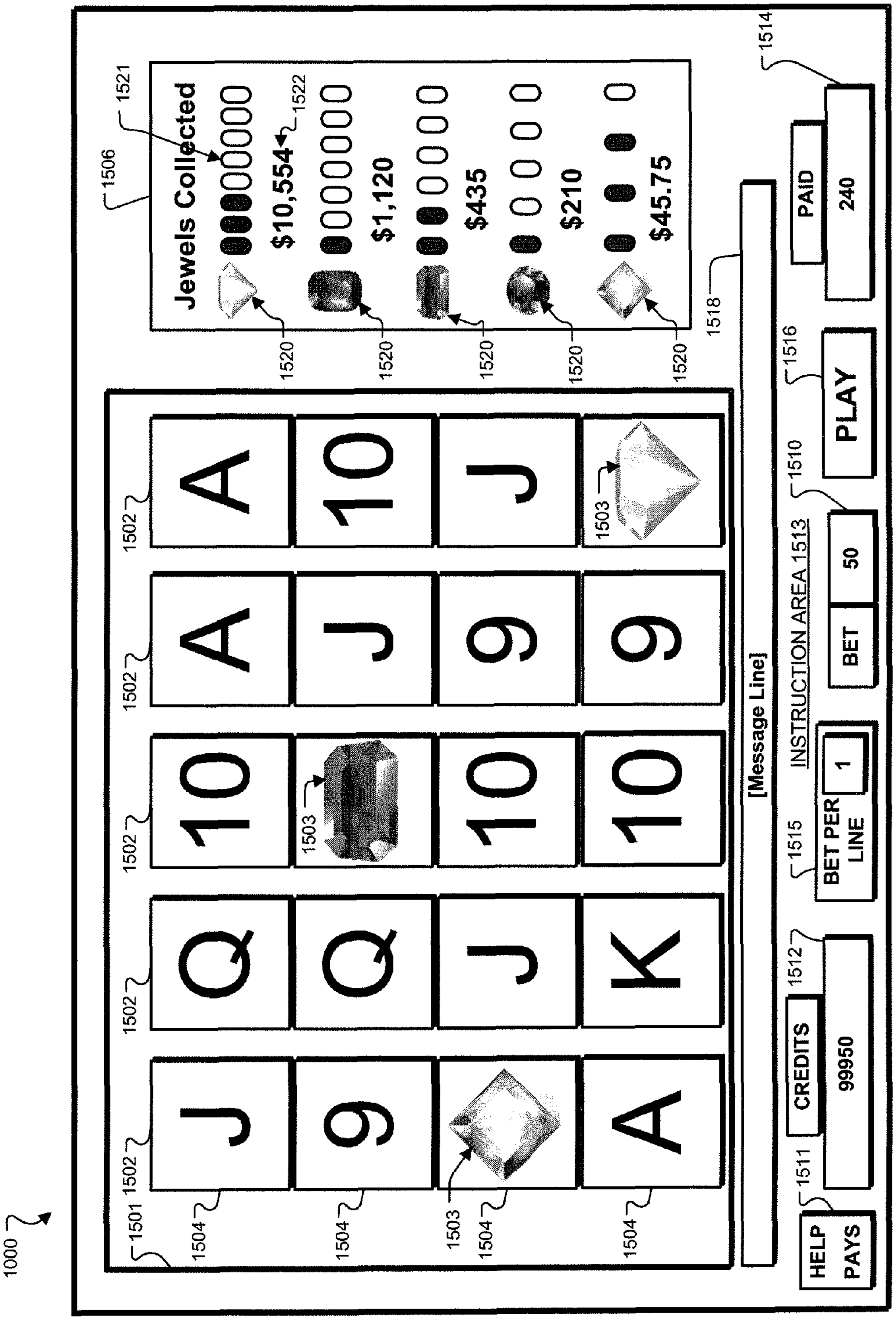
FIG. 1B is a screen diagram of the same game in progress demonstrating one version of the progressive prize segment feature.

FIG. 1A is an example screen diagram of bonus display or game screen 1000 including an example reel game with a prize segment feature. This view is shown at the beginning of a free spin bonus round in one embodiment, and the instruction box or splash window 1507 gives instructions to the player regarding the features of the bonus game. FIG. 1B is a screen diagram of the same game in progress demonstrating one version of the progressive prize segment feature. Regarding FIGS. 1A-1B, in this depicted example embodiment, game screen 1000 has a first gaming zone, which in this embodiment is a matrix of symbol locations 1501, in which is displayed the primary conduct of the base game and the free spin bonus game described herein. The matrix of symbol locations 1501 consists of five simulated reels 1502, and each reel has four positions or symbol locations 1504. Depicted in several symbol locations 1504 are the jewel symbols 1503, which appear in certain free spin results in the preferred embodiment to accumulate prize segments and advance toward winning a prize as further described below.

Next to the matrix of symbol locations 1501 is the progressive prize segment zone 1506, which includes, in this version, five different prize meter zones 1520 each including a plurality of prize segments 1521, which are filled by collecting symbols to advance toward collecting a progressive prize. Each meter zone 1520 also includes a symbol display (at arrow 1520) associating the meter with its respective jewel symbol 1503, and a progressive prize meter 1522 showing the current amount of multiple networked progressive prizes that are available to be won by filling the prize segments 1521 within a free spin bonus round. The preferred Crystal Jackpots game described herein uses a theme of accumulating various jewel symbols 1503 to fill the prize segments 1521. The jewel symbols are a form of prize segment symbols which could, of course, be any other suitable theme symbol. It is noted that the meter zones 1520 preferably include varying numbers of segments 1521, in order to provide the desired probabilities of winning the respective progressive prizes. The higher value progressive prize, as shown, includes eight segments 1521, three of which have been already been filled by collecting or accumulating the white jewel prize symbols that have appeared in the depicted bonus round on the fifth reel 1502. This top-depicted prize meter zone 1520 is tied to the highest value progressive prize possible in this embodiment, which shows a current value on the progressive meter 1522 of $10,554. The progressive meters 1522 for each prize meter zone 1520 have a chosen number of segments 1521 making the lower value prizes easier to win, or more probable to fill all segments in the prize meter zone within the course of a particular free spin bonus round. The identification and number of segments for each prize meter zone 1520 are listed in the instruction box 1507 of FIG. 1A for this example embodiment. By way of reference the “4 Yellow Jewels” which may be collected from reel 1 as described in instruction box 1507 corresponds to the lowest-depicted prize meter zone 1520 in FIG. 1B, which shows that only 4 prize segments 1521 need to be filled in order to collect the progressive prize, which has a current prize value of $45.75. The meaning of the remaining meter zones up to the highest value white jewels meter zone for jewels collected from reel 5 may be shown from the figures accordingly. It is noted that preferably the type of jewel or prize segment symbol 1503 identified in instruction box 1507 and used to fill the prize segments 1521 only appears on the designated reel 1502. That is, the white (diamond-shaped) jewel 1503 only appears on reel 5 (counting from left to right). In a preferred game, zero, one, or two jewels of the same type may appear on the reel in a given free spin result. Some embodiments may limit the appearance to no more than one, and some may provide that up to three or four jewels of the same type may appear in the same spin result. The accumulation and use of the prize symbols 1503 in the context of the depicted bonus game is further described, in different embodiments, with respect to the flowcharts of FIGS. 2A and 2B. Of course, while in this embodiment progressive prizes are shown, other versions may provide fixed bonus prizes without progressive contributions. In that case, obviously the prize values 1522 shown would not change in the course of a round (as they would in progressive embodiments when progressive contributions are made by other players on the same progressive network).

Along the bottom of the diagram in FIGS. 1A and 1B are found various game information and interaction buttons such as the current wager display 1510, available credits display 1512, the current payout display 1514, and the bet per line display 1515. The touchscreen play button 1516 may be used instead of the manual button shown on the example gaming cabinet in FIG. 3A. The Help/Pays button 1511 accesses the help screen and paytable information for the game. Along the bottom of the matrix 1501, there is a message line 1518 for showing current messages to the player from the game or gaming network. Between the message line 1518 and the lower display items is an instruction area 1513 which is updated to display various instructions or feature explanations regarding the game.

Figure 2A:
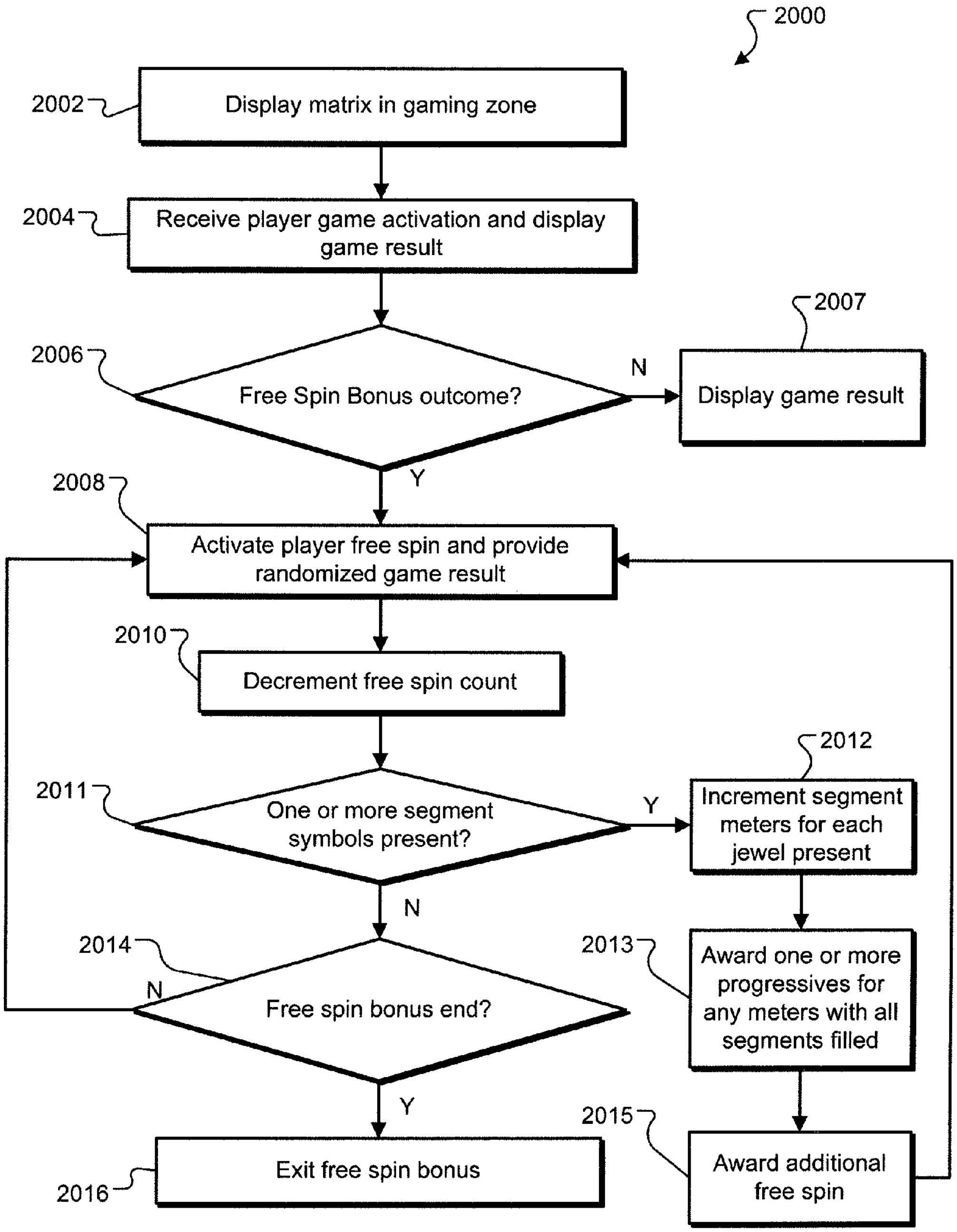
FIG. 2A is a flowchart showing an example of the game play process at a gaming machine that includes the progressive prize segment feature according to an example embodiment.

FIG. 2A is a flowchart showing a game play process 2000 according to one or more embodiments of the invention. The depicted process at step 2002 displays the gaming matrix in the first gaming zone, the process beginning with the game in base game mode and not yet displaying any prize meter zones 1520. Next, at step 2004, the process receives a player game activation and, in response, displays a game result, which may include other features and animations, but particularly may include a free spin bonus outcome triggered by a designated pattern. In one embodiment, the free spin trigger pattern is three or more bonus symbols scattered on any of the five reels. The process next at step 2006 determines if a free spin bonus trigger occurred and if not, the process displays the game result with any other features it contains at step 2007. If a free spin result is found at step 2006, the process goes to step 2008 where the free spin round is conducted, including progressive prize segment accumulation as described below.

The free spin bonus round preferably includes multiple free spins that are conducted in a sequence to complete the free spin bonus round by repeating the depicted steps. At step 2008, each free spin is activated and a randomized game result animated and shown on the symbol locations 1504 such as those depicted in FIG. 1B. Each bonus round begins with a number or count of allocated free spins, which may or may not be shown to the player. When each free spin result is shown, the count is decremented at step 2010. Next, at step 2011, the free spin result is checked to see if any prize segment symbols 1503 (jewel symbols 1503, for example), are present in the result. If so, the process goes to step 2012 where it fills in an additional meter segment 1521 in the appropriate prize meter zone 1520 for each prize segment symbol 1503 present, with a suitable animation communicating to the player that each meter segment was filled, and changing the display of the meter segment accordingly by filling in or otherwise changing each accumulated segment to show that a prize segment symbol is recorded as accumulated for the present bonus round. Prize segment symbols may be allowed to occur on more than one reel in the same result. If this step fills the final empty segment for any particular meter, the related progressive prize is awarded to the player at step 2013. Some versions may end the bonus round at such a progressive award, but preferably the bonus round continues until all allocated free spins are employed, giving the player a possibility of winning more than one progressive prize in a single bonus round.

From step 2013, some embodiments may then go immediately to step 2014 to determine whether any more free spins are allowed in the free spin bonus round. If so, the process goes back to step 2008 to start the next free spin. But some embodiments may provide, like the depicted flow chart process, that accumulating a prize segment increases the free spin count and gives the player more free spins in the bonus round, as depicted at step 2015.

For free spin outcomes that do not contain a prize segment symbol 1503, the process at step 2011 goes to step 2014 where it determines whether to continue the free spin bonus round as described based on the allotted number of free spins. If no free spins are left, the process exits the free spin bonus round at step 2016, wiping all the accumulated prize segment symbols from the meter zones 1520.

If more free spins are provided in the bonus round, the process at step 2014 returns to step 2008 for the next free spin activation. If not, the process exits the free spin bonus at step 2016.

Figure 2B:
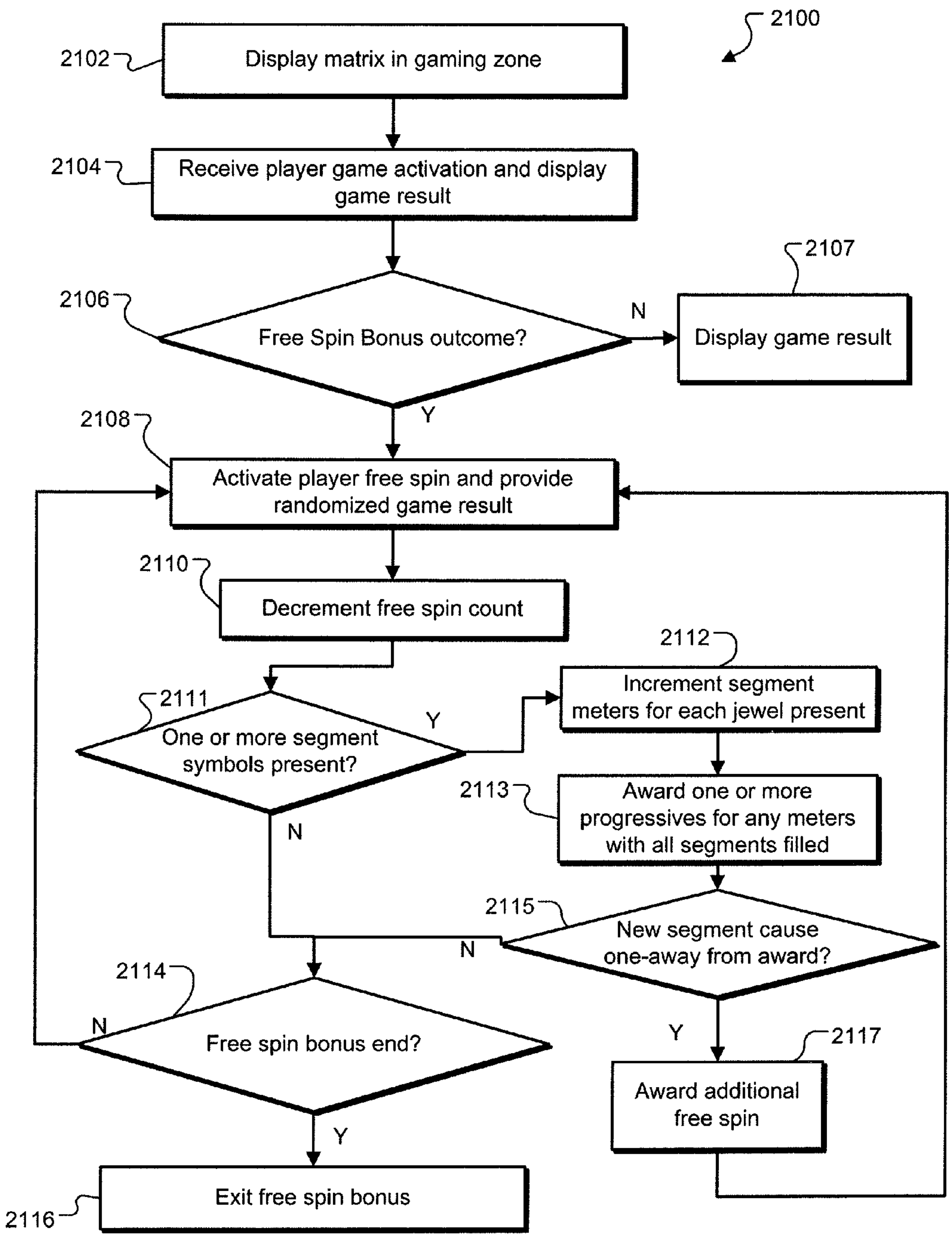
FIG. 2B is a flowchart showing a game play process according to another embodiment of the invention.

FIG. 2B depicts a flowchart of a bonus game process 2100 for an alternative embodiment of the invention, which proceeds similarly to the process shown in FIG. 2A, with the difference being how additional free spins are awarded based on the accumulation of symbols. The identical steps to those in FIG. 2A will not be described again. In this embodiment, when a prize segment symbol 1503 is accumulated in any particular free spin result, the process goes from step 2112 to step 2113, where it awards a progressive prize for any meter that may have been filled by the accumulated segment. The free spin round may end with any progressive award in alternative embodiments as discussed above with respect to FIG. 2A. In embodiments that allow the player to continue toward other progressive prizes, as depicted in FIG. 2B, the process goes from step 2113 to step 2115 where it determines if the accumulated segment caused the particular meter zone to be one segment away from being completely filled and winning a progressive prize. If this is the case, the process goes to step 2117, where an additional free spin is given to the player by adding to the free spin count. In this manner, if a player is nearly winning a prize (has a "near miss"), the gaming experience is made more exciting by giving them another chance to accumulate that final segment and win a prize. Some versions may only provide the additional free spin if the free spin bonus round is already on the final spin, and others may provide it every time a newly accumulated prize segment symbol causes the "near miss."

Figure 3A:
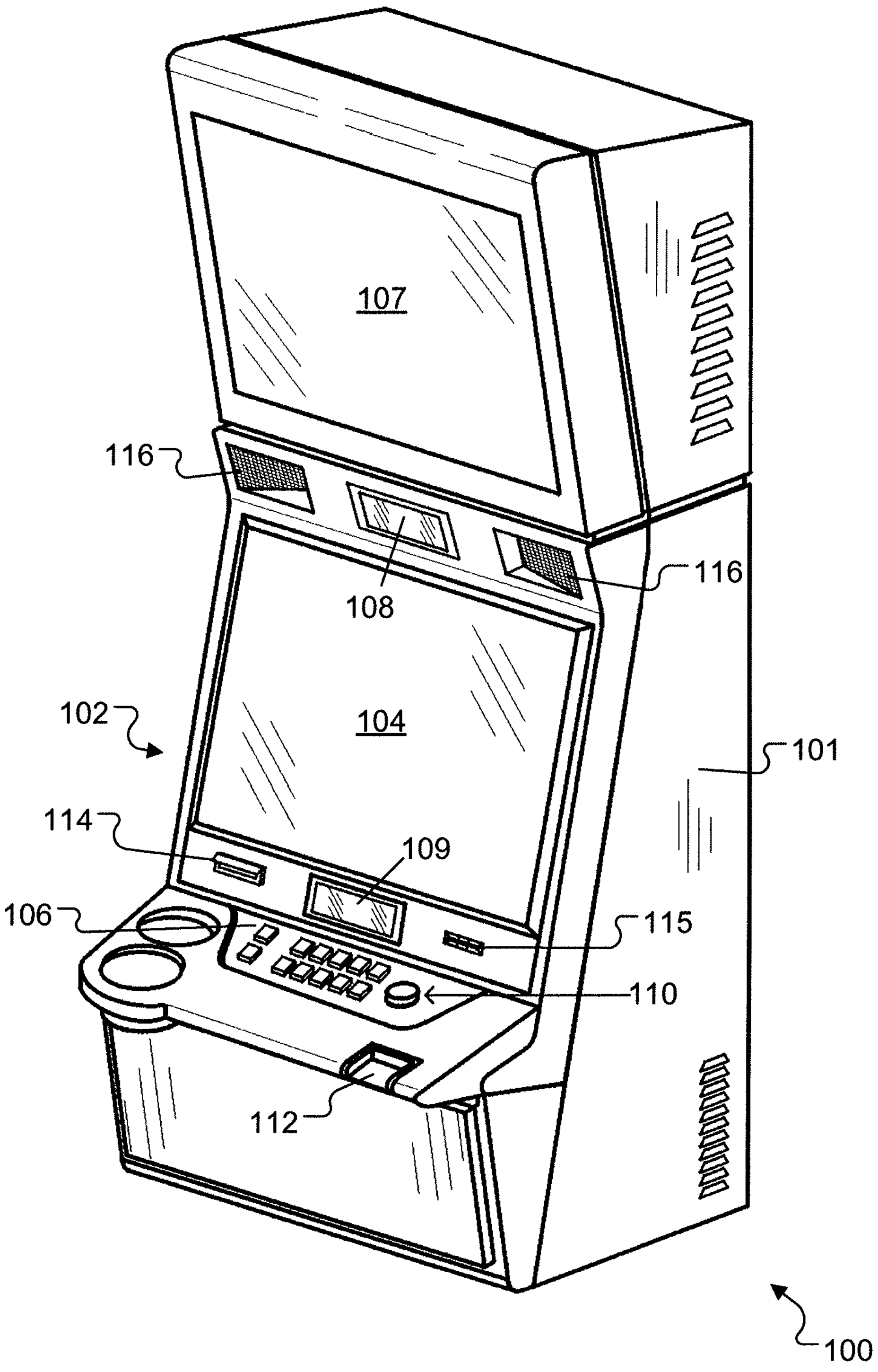
FIG. 3A is a front perspective view of a gaming machine which may be used in a gaming system embodying the principles of the present invention.
Figure 3B:
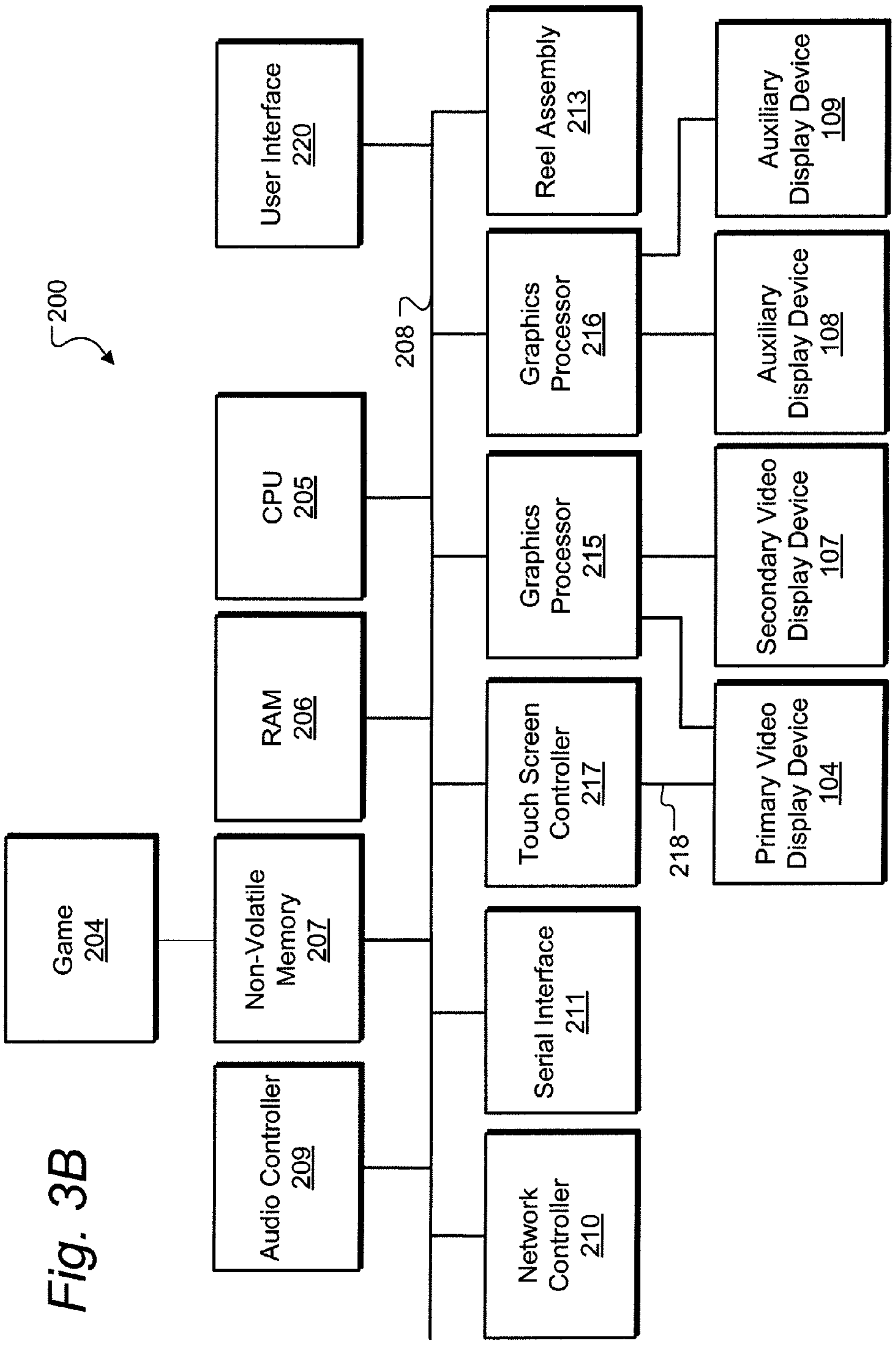
FIG. 3B is a block diagram showing various electronic components of the gaming machine shown in FIG. 3A together with additional gaming system components.

FIG. 3A shows a gaming machine 100 that may be used to implement a progressive prize segment game according to the present invention. The block diagram of FIG. 3B shows further details of gaming machine 100. Referring to FIG. 3A, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3A also includes a number of mechanical control buttons 110 mounted on ledge 106. These control buttons 110 may allow a player to select a bet level, select paylines, select a type of game or game feature, and actually start a play in a primary game. Further, primary video display device 104 in gaming machine 100 provides a convenient display device for implementing touchscreen controls.

It will be appreciated that gaming machines may also include a number of other player interface devices in addition to devices that are considered player controls for use in playing a particular game. The ledge may also include a hardware special object including a button, touch sensor, or switches, joysticks, or other mechanical input devices, and/or virtual buttons and other controls implemented on a suitable touchscreen video display. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 3B shows a logical and hardware block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 3A). A second graphics processor 216 is also connected on bus 208 in this example to drive the auxiliary display devices 108 and 109 also shown in FIG. 3A. As shown in FIG. 3B, gaming machine 100 also includes a touch screen controller 217 connected to system bus 208. Touch screen controller 217 is also connected via signal path 218 to receive signals from a touchscreen element associated with primary video display device 104. It will be appreciated that the touchscreen element itself typically comprises a thin film that is secured over the display surface of primary video display device 104. The touchscreen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3B are elements commonly associated with a personal computer. These elements are preferably mounted on a standard personal computer chassis and housed in a standard personal computer housing which is itself mounted in cabinet 101 shown in FIG. 3A. Alternatively, the various electronic components may be mounted on one or more circuit boards housed within cabinet 101 without a separate enclosure such as those found in personal computers. Those familiar with data processing systems and the various data processing elements shown in FIG. 3B will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 3B as being connected directly on system bus 208 may in fact communicate with the other system components through a suitable expansion bus. Audio controller 209, for example, may be connected to the system via a PCI bus. System bus 208 is shown in FIG. 3B merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. In some embodiments, the progressive prize segment may be displayed on secondary video display 107 rather than beside the matrix of symbol locations or other type of primary gaming zone on the primary display. The invention is not limited to any particular arrangement of processing devices for controlling the video display device included with gaming machine 100. Also, a gaming machine implementing the present invention is not limited to any particular number of video display devices or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine, and may also implement a game client for directing one or more display devices at the gaming machine to display portions of a progressive prize segment game according to the present invention. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs, while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the progressive prize segment game as will be discussed below in connection with FIG. 4A.

It should be noted that the invention is not limited to gaming machines employing the personal computer-type arrangement of processing devices and interfaces shown in example gaming machine 100. Other gaming machines through which a progressive prize segment game is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement a progressive prize segment game within the scope of the present invention using an electro mechanical arrangement or even a purely mechanical arrangement for displaying the symbols or first and second animations or reactions needed to complete the progressive prize segment game as described herein. However, the most preferred forms of the invention utilize one or more video display devices for displaying the spinning reels and prize segment meters. For example, a gaming machine suitable for providing a progressive prize segment game may include a mechanical reel-type display rather than a video-type display device for displaying results in a primary game, and include a video display device for presenting the progressive prize segment or object separately.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and reel assembly 213 (if mechanical reel configuration). CPU or game processor 205 may comprise a conventional microprocessor, such as an Intel Pentium microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information, and game processor 205 may respond according to its programming, such as to apply a wager and initiate execution of a game.

Figure 4A:
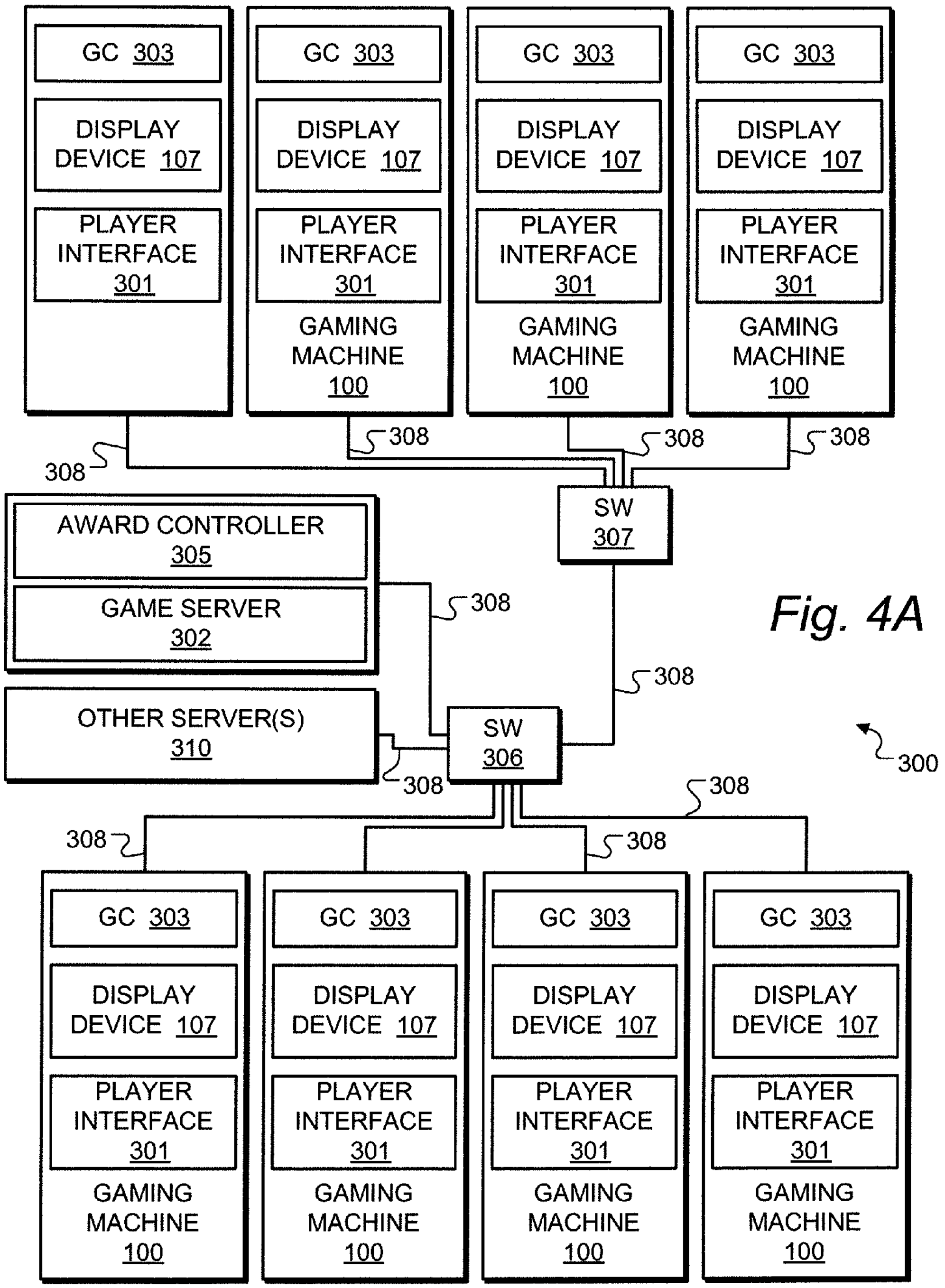
FIG. 4A is a system block diagram of a gaming system according to one embodiment of the present invention.
Figure 4B:
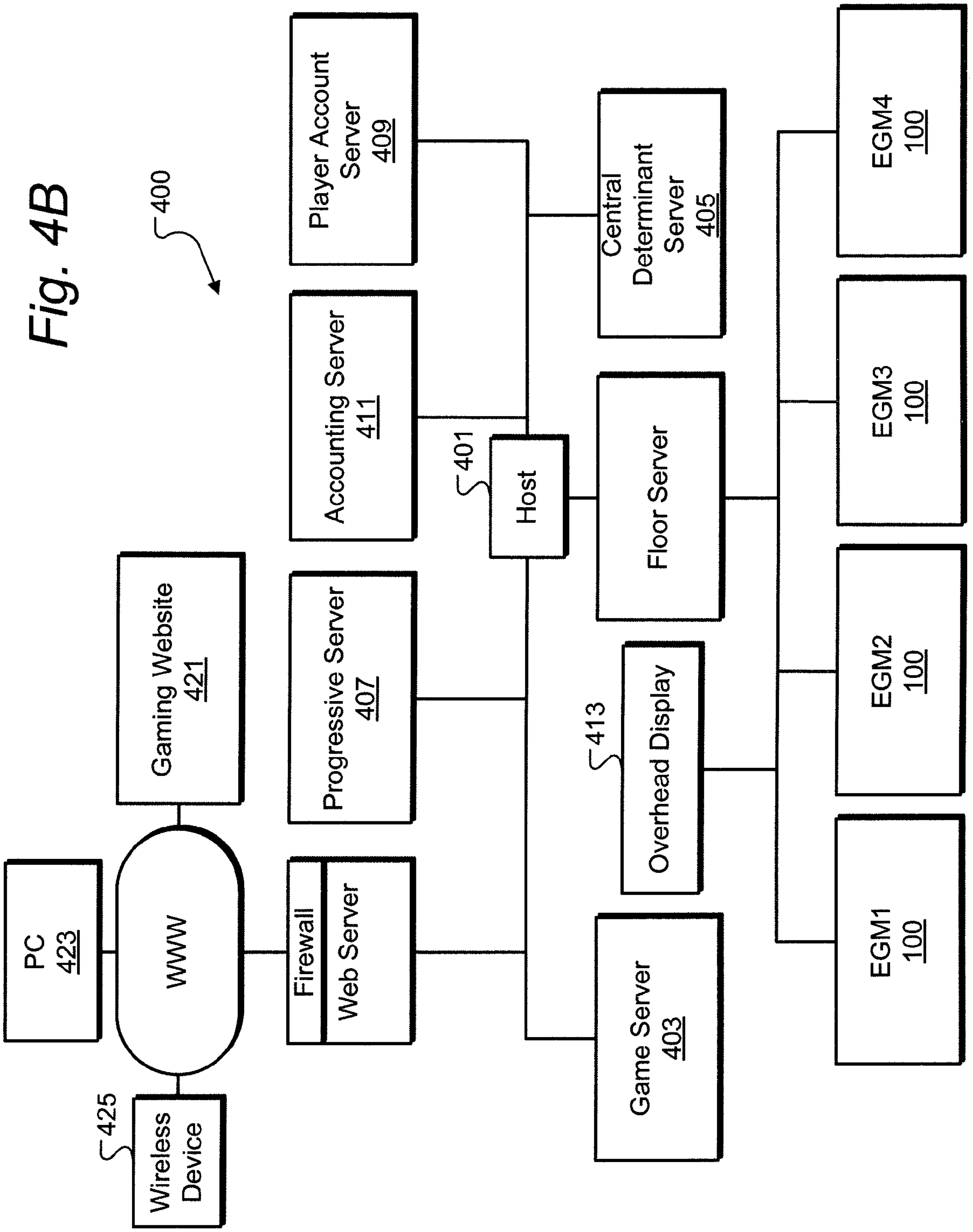
FIG. 4B is a system block diagram of a gaming system according to another embodiment of the invention.

Game processor 205 also may connect through network controller 210 to a gaming network, such as example casino server network 400 shown in FIG. 4B. Referring now to FIG. 4B, the casino server network 400 may be implemented over one or more site locations and include host server 401, remote game play server 403 (which may be configured to provide game processor functionality including determining game outcomes and providing audio/visual instructions to a remote gaming device), central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Referring now to FIG. 4A, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 4A is shown as including a video display device 107 and a player interface 301 that may include buttons, switches, or other physical controls and/or touchscreen controls as discussed above in connection with FIG. 4A. System 300 further includes a game server 302 and a respective game client 303 (abbreviated “GC” in FIG. 4A) included with each respective gaming machine 100. In the form of the invention shown in FIG. 4A, these two components, game server 302 and the game client components 303, combine to implement a game control arrangement which will be described in detail below. System 300 also includes an award controller 305, which is shown in FIG. 4A as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 4A.

Each gaming machine 100, and particularly player interface 301 associated with each gaming machine, allows a player to make any inputs that may be required to make the respective gaming machine eligible for a progressive prize segment game. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of a progressive prize segment game at the respective gaming machine.

The game control arrangement made up of game server 302 and the respective game client 303 at a given gaming machine functions to control the respective video display device 107 for that gaming machine. Award controller 305 is responsible for awarding prizes for a player’s participation in a progressive prize segment game, and maintaining progressive prize information for the game’s progressive prizes. The network arrangement made up of network switches 306 and 307, and the various communication links 308 shown in FIG. 4A is illustrated merely as an example of a suitable communications arrangement. It should be noted that the game control arrangement, or as it is referred to generally the “game controller,” may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 4A shows other server(s) 310 included in the network. This illustrated “other server(s)” element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) other than the progressive prize segment game described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 4A are shown only to indicate that numerous other components may be included along with the elements that participate in providing progressive prize segment games according to the present invention. Other server(s) 310 may provide record keeping, player tracking, accounting, result identifying services, or any other services that may be useful or necessary in a gaming system.

Referring to FIG. 4B, a block diagram of another example networked gaming system 400 associated with one or more gaming facilities is shown, including one or more networked gaming machines 100 in accordance with one or more embodiments. With reference to FIG. 4B, while a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective player’s video images may be displayed on overhead display 413 along with the content of the player’s gaming machine 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Blackberry cell phone, Apple iPhone, personal data assistant (PDA), iPad, etc.). To enter the website, a player may log in with a username (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for providing a wagering game to a player, the method including:

(a) controlling a gaming display with one or more electronic processors, the gaming display including a first gaming zone comprising a matrix of symbol locations which are updated to provide results of the game;

(b) receiving a player game activation and, in response, providing an animated display in the first gaming zone showing motion in the symbol locations which stops to provide a game outcome;

(c) determining if the game outcome is a free spin bonus outcome, and, in response, beginning a free spin bonus round including multiple free spin outcomes each providing a free spin randomization of the matrix of symbol locations and an award opportunity, and in which a group of progressive prize segment meters are shown, each associated with a different progressive prize and each including a plurality of symbol accumulation segments linked to a designated prize segment symbol that may appear in the free spin bonus round;

(d) for each free spin, conducting a free spin animated display having a chance to provide one or more prize segment symbols which cause their linked prize segment meter to increase the number of accumulated prize segment symbols shown; and (e) for each free spin, determining if a particular progressive prize segment meter has accumulated its full capacity of prize segment symbols, and, if so, awarding an associated progressive prize to the player.

2. The method of claim 1, in which a single free spin is allowed to accumulate prize segment symbols in more than one of the progressive prize segment meters.

3. The method of claim 1, in which a single free spin is allowed to accumulate more than one prize segment symbol in a single progressive prize segment meter by showing more than one prize segment symbol on the same reel linked to that particular prize segment meter.

4. The method of claim 3, in which each reel is only allowed to show a prize segment symbol linked to a single associated prize segment meter.

5. The method of claim 1, in which each reel is only allowed to show a prize segment symbol linked to a single associated prize segment meter.

6. The method of claim 1, in which the free spin bonus round is further operated to determine if each prize segment symbol caused its linked prize segment meter to accumulate enough prize segment symbols to be one prize segment symbol away from receiving a prize, and, if so, awarding an additional free spin.

7. The method of claim 6, in which the free spin bonus round is operated to award the additional free spin only if the current spin was a final allocated free spin in the free spin bonus round.

8. The method of claim 1, in which the free spin bonus round is further operated to award an additional free spin for each free spin outcome in which a prize segment symbol is accumulated.

9. A program product embodied in one or more tangible computer readable media, the program product including code executable by a gaming machine and at least one gaming server for:

(a) controlling a gaming display with one or more electronic processors, the gaming display including a first gaming zone comprising a matrix of symbol locations which are updated to provide results of the game;

(b) receiving a player game activation and, in response, providing an animated display in the first gaming zone showing motion in the symbol locations which stops to provide a game outcome;

(c) determining if the game outcome is a free spin bonus outcome, and, in response, beginning a free spin bonus round including multiple free spin outcomes each providing a free spin randomization of the matrix of symbol locations and an award opportunity, and in which a group of progressive prize segment meters are shown, each associated with a different progressive prize and each including a plurality of symbol accumulation segments linked to a designated prize segment symbol that may appear in the free spin bonus round;

(d) for each free spin, conducting a free spin animated display having a chance to provide one or more prize segment symbols which cause their linked prize segment meter to increase the number of accumulated prize segment symbols shown; and (e) for each free spin, determining if a particular progressive prize segment meter has accumulated its full capacity of prize segment symbols, and, if so, awarding an associated progressive prize to a player.

10. The program product of claim 9, in which a single free spin is allowed to accumulate prize segment symbols in more than one of the progressive prize segment meters.

11. The program product of claim 9, in which a single free spin is allowed to accumulate more than one prize segment symbol in a single progressive prize segment meter by showing more than one prize segment symbol on the same reel linked to that particular prize segment meter.

12. The program product of claim 11, in which each reel is only allowed to show a prize segment symbol linked to a single associated prize segment meter.

13. The program product of claim 9, in which each reel is only allowed to show a prize segment symbol linked to a single associated prize segment meter.

14. The program product of claim 9, in which the free spin bonus round is further operated to determine if each prize segment symbol caused its linked prize segment meter to accumulate enough prize segment symbols to be one prize segment symbol away from receiving a prize, and, if so, awarding an additional free spin.

15. The program product of claim 14, in which the free spin bonus round is operated to award the additional free spin only if the current spin was a final allocated free spin in the free spin bonus round.

16. The program product of claim 9, in which the free spin bonus round is further operated to award an additional free spin for each free spin outcome in which a prize segment symbol is accumulated.

* * * * *